(12) United States Patent
Sanjeepan et al.

(10) Patent No.: US 10,210,012 B2
(45) Date of Patent: Feb. 19, 2019

(54) TECHNIQUES FOR PERSISTENT MEMORY VIRTUALIZATION

(71) Applicant: Intel Corporation, Santa Clara, CA (US)

(72) Inventors: Vivekananthan Sanjeepan, Hillsboro, OR (US); Leena K. Puthiyedath, Portland, OR (US); Chandan Apsangi, Hillsboro, OR (US); Nikhil Talpallikar, Hillsboro, OR (US); Abinash K. Barik, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 15/193,995

(22) Filed: Jun. 27, 2016

(65) Prior Publication Data

US 2017/0371695 A1    Dec. 28, 2017

(51) Int. Cl.
*G06F 9/455* (2018.01)
*G06F 3/06* (2006.01)
*G06F 9/4401* (2018.01)
*G06F 12/1009* (2016.01)

(52) U.S. Cl.
CPC .......... *G06F 9/45558* (2013.01); *G06F 3/061* (2013.01); *G06F 3/065* (2013.01); *G06F 3/0619* (2013.01); *G06F 3/0665* (2013.01); *G06F 3/0683* (2013.01); *G06F 3/0685* (2013.01); *G06F 9/442* (2013.01); *G06F 12/1009* (2013.01); *G06F 2009/45583* (2013.01); *G06F 2212/1032* (2013.01); *G06F 2212/152* (2013.01)

(58) Field of Classification Search
CPC ...... G06F 9/4558; G06F 9/442; G06F 3/0619; G06F 3/065; G06F 3/0685; G06F 12/1009; G06F 12/109; G06F 2009/45583; G06F 2212/1032; G06F 2212/152; G06F 9/45558
See application file for complete search history.

(56) References Cited

U.S. PATENT DOCUMENTS

2006/0136765 A1    6/2006    Poisner et al.
2009/0113110 A1    4/2009    Chen et al.
2009/0125902 A1    5/2009    Ghosh et al.
(Continued)

OTHER PUBLICATIONS

International Search Report and Written Opinion for PCT Patent Application No. PCT/US/2017/035034, dated Sep. 4, 2017, 16 pages.

*Primary Examiner* — Jacob D Dascomb
(74) *Attorney, Agent, or Firm* — Compass IP Law PC

(57) ABSTRACT

Examples may include techniques for persistent memory virtualization. Persistent memory maintained at one or more memory devices coupled with a host computing device may be allocated and assigned to a virtual machine (VM) hosted by the host computing device. The allocated persistent memory based on a file based virtual memory to be used by the VM. An extended page table (EPT) may be generated to map physical memory pages of the one or more memory devices to virtual logical blocks of the file based virtual memory. Elements of the VM then enumerate a presence of the assigned allocated persistent memory, create a virtual disk abstraction for the file based virtual memory and use the EPT to directly access the assigned allocated persistent memory.

22 Claims, 10 Drawing Sheets

(56) References Cited

U.S. PATENT DOCUMENTS

| | | | |
|---|---|---|---|
| 2010/0122077 A1* | 5/2010 | Durham | G06F 1/3203 713/100 |
| 2012/0110236 A1 | 5/2012 | Ali et al. | |
| 2013/0205106 A1* | 8/2013 | Tati | G06F 3/061 711/159 |
| 2015/0178198 A1* | 6/2015 | Pratt | G06F 12/08 711/6 |
| 2016/0055021 A1* | 2/2016 | Beveridge | G06F 9/45558 718/1 |
| 2016/0118121 A1* | 4/2016 | Kelly | G06F 13/4068 710/301 |
| 2016/0179375 A1 | 6/2016 | Kirvan et al. | |
| 2017/0300386 A1* | 10/2017 | Shulga | G06F 11/1451 |

* cited by examiner

800

RECEIVE AN ALLOCATION OF PERSISTENT MEMORY MAINTAINED AT ONE OR MORE MEMORY DEVICES COUPLED WITH A HOST COMPUTING DEVICE, THE PERSISTENT MEMORY ALLOCATED TO ONE OR MORE VMS HOSTED BY THE HOST COMPUTING DEVICE BASED ON RESPECTIVE FILE BASED VIRTUAL MEMORY TO BE USED BY THE ONE OR MORE VMS
802

ASSIGN AT LEAST A PORTION OF THE ALLOCATED PERSISTENT MEMORY TO A VM FROM AMONG THE ONE OR MORE VMS BY CREATING AN EPT TO MAP AT LEAST ONE PHYSICAL MEMORY PAGE MAINTAINED BY AT LEAST ONE OF THE MEMORY DEVICES TO FIRST VIRTUAL LOGICAL BLOCKS OF A FILE BASED VIRTUAL MEMORY TO BE USED BY THE VM
804

PROVIDE INFORMATION TO THE VM FOR THE VM TO ENUMERATE A PRESENCE OF THE ASSIGNED ALLOCATED PERSISTENT MEMORY, CREATE A VIRTUAL DISK ABSTRACTION FOR THE FILE BASED VIRTUAL MEMORY AND USE THE EPT TO DIRECTLY ACCESS THE ASSIGNED ALLOCATED PERSISTENT MEMORY
806

CAUSE THE VM TO SHUT DOWN
808

GENERATE A FILE FROM DATA STORED TO THE ASSIGNED ALLOCATED PERSISTENT MEMORY
810

COPY THE FILE TO A SECOND HOST COMPUTING DEVICE ARRANGED TO SUPPORT THE VM
812

*FIG. 8*

Storage Medium 900

Computer Executable
Instructions for 800

*FIG. 9*

TECHNIQUES FOR PERSISTENT MEMORY VIRTUALIZATION

TECHNICAL FIELD

Examples described herein are generally related to use of persistent memory in a computing system.

BACKGROUND

Persistent memory may be characterized as a way to store data structures such that the data structures may continue to be accessible using memory instructions or memory application programming interfaces (APIs) even after the process that created or last modified the data structures ends. Persistent memory may be accessed in a similar manner to types of volatile memory used for system memory of a computing system (e.g., dynamic random access memory (DRAM)), but it retains stored data structures across power loss in a similar manner to computer storage (e.g., hard disk drives or solid state drives). Persistent memory capabilities extend beyond an ability to retain stored data structures across power loss. For example, key metadata, such as page table entries or other constructs that translate virtual addresses to physical addresses also need to be retained across power loss.

BRIEF DESCRIPTION OF THE DRAWINGS

FIG. 8 illustrates an example logic flow.
FIG. 9 illustrates an example storage medium.

DETAILED DESCRIPTION

In some examples, application of persistent memory as a direct access storage (DAS) by an operating system (OS) may provide a relatively high speed and low latency storage for software applications hosted or supported by a computing device. However, possible performance benefits of DAS may be lost when storage arranged for DAS is virtualized by a virtual machine monitor (VMM) of the hosting computing device. Also, current techniques to virtualize storage maintained by a host computing device for use by a guest OS to be executed or implemented by a virtual machine (VM) hosted by the host computing device may use a file based virtual memory. The file based virtual memory may be similar to a virtual hard drive (VHD) or a virtual machine disk (VMDK). A file based virtual memory may be flexible and portable but has performance constraints (e.g., higher latencies) that reduce the benefits attributed to application of persistent memory as a DAS by the guest OS for the VM.

According to some examples, current technique for use of virtual memory for virtualized storage may use a file accessible to a host OS to provide a virtual disk abstraction. The virtual memory file may be arranged to maintain a mapping of virtual logical blocks to a file offset and file blocks that back the virtual logical blocks. In some examples, a storage access interface abstraction (e.g., small computer system interface (SCSI) disk abstraction) may be exposed to the guest OS. Disk accesses generated by the guest OS or applications executed by VM may be routed through the VMM to the host OS. The host OS may then look up the mapping of the virtual logical block or blocks to file block and then read/write the corresponding file block. These current techniques may provide at least some flexibility and portability in that it may be possible to copy the file to another host computing device and attach to a different VM associated with that other host computing device. The virtual memory, in some examples, may be thinly provisioned such that file blocks backing the virtual logical volume are allocated on demand. However this thinly provisioned technique has significant performance overhead due to the need of the guest to send requests for allocation to the host and then receive allocations in response to the requests. Hence when the backing storage of the virtual memory is also arranged as a DAS volume for the guest OS for the VM, performance benefits for using persistent memory for the DAS volume may not be realized by the guest OS for the VM.

Figure 1:
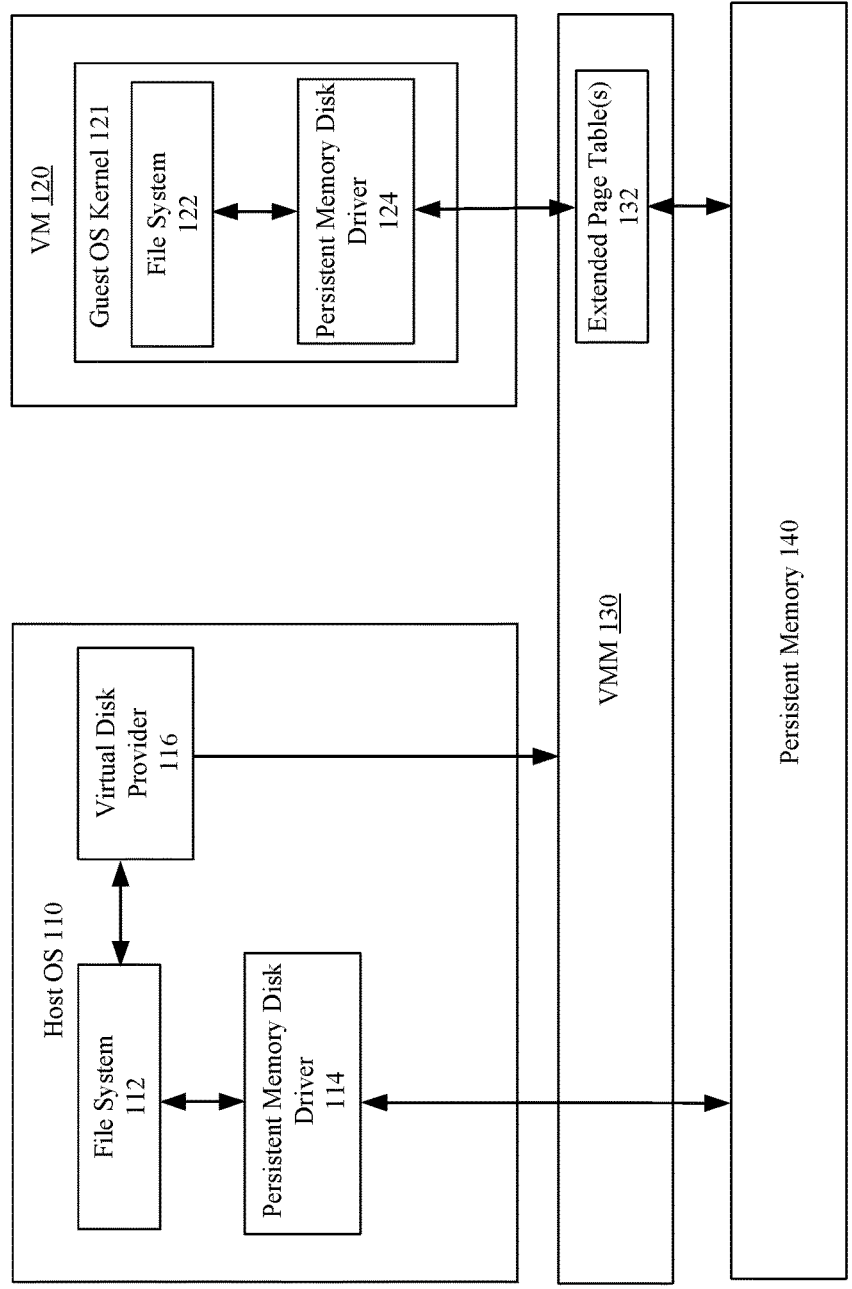
FIG. 1 illustrates an example first system.

FIG. 1 illustrates an example system 100. In some examples, as shown in FIG. 1, system 100 includes a host operating system (OS) 110, a virtual machine (VM) 120, a virtual machine monitor (VMM) 130 and a persistent memory 140. According to some examples, system 100 may be at least part of a host computing device that may include, but is not limited to, a personal computer, a desktop computer, a laptop computer, a tablet, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

According to some examples, as shown in FIG. 1, host OS 110 may include a file system 112, a persistent memory disk driver 114 and a virtual disk provider 116. As described in more detail below, these elements of host OS 110 may work in collaboration with VMM 130 to directly allocate or assign at least a portion of persistent memory 140 to create a file based virtual memory for use by elements of VM 120. These elements of VM 120 such as a file system 122 and a persistent memory disk driver 124 for guest OS kernel 121 may be capable of directly accessing physical blocks of persistent memory 140 backing the file based virtual memory through one or more extended page table(s) 132 maintained by VMM 130 to utilize the file based virtual memory. In this manner, the direct accessing of the physical blocks of persistent memory 140 backing the file based virtual memory may result in the file based virtual memory residing on a DAS volume. Once the file based virtual memory residing on the DAS volume is established, direct access by elements of VM 120 may occur without involvement of VMM 130 or host OS 110.

In some examples, persistent memory 140 may be composed of one or more memory devices which may include various types of volatile and/or non-volatile memory. Volatile memory may include, but is not limited to, random-access memory (RAM), Dynamic RAM (D-RAM), double data rate synchronous dynamic RAM (DDR SDRAM), static random-access memory (SRAM), thyristor RAM (T-RAM) or zero-capacitor RAM (Z-RAM). Non-volatile memory may include, but is not limited to, non-volatile types of memory such as 3-D cross-point memory that may be byte or block addressable. These block addressable or byte addressable non-volatile types of memory may include, but are not limited to, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other non-volatile memory types.

According to some examples, the one or more memory devices included in persistent memory 140 may be designed to operate in accordance with various memory technologies. The various memory technologies may include, but are not limited to, DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WI02 (Wide I/O 2 (WideIO2), JESD229-2, originally published by JEDEC in August 2014), HBM (HIGH BAND-WIDTH MEMORY DRAM, JESD235, originally published by JEDEC in October 2013), and/or other technologies based on derivatives or extensions of such specifications. The various memory technologies may also include memory technologies currently in development that may include, but are not limited to, DDR5 (DDR version 5, currently in discussion by JEDEC), LPDDR5 (LPDDR version 5, currently in discussion by JEDEC), HBM2 (HBM version 2, currently in discussion by JEDEC), and/or other new technologies based on derivatives or extensions of these developing memory technologies.

In some examples, the one or more memory devices may be located on one or more dual in-line memory modules (DIMMs) coupled with a host computing device that may host the elements of system 100 shown in FIG. 1. These DIMMs may be designed to function as a registered DIMM (RDIMM), a load reduced DIMM (LRDIMM), a fully-buffered DIMM (FB-DIMM), an unbuffered DIMM (UDIMM) or a small outline (SODIMM). Examples are not limited to only these DIMM designs.

According to some examples, memory devices of persistent memory 140 maintained on one or more DIMMs may include all or combinations of types of volatile or non-volatile memory. For example, memory devices of a first type of DIMM may include volatile memory on a front or first side and may include non-volatile memory on a back or second side. In other examples, a second type of DIMM may include combinations of non-volatile and volatile types of memory on either side of this second type of DIMM. In other examples, all memory devices on a given DIMM may be either volatile types of memory or non-volatile types of memory. In other examples, a third type of DIMM may include non-volatile memory and at least some volatile memory and this third type of DIMM may be referred to as a non-volatile DIMM (NVDIMM).

Figure 2:
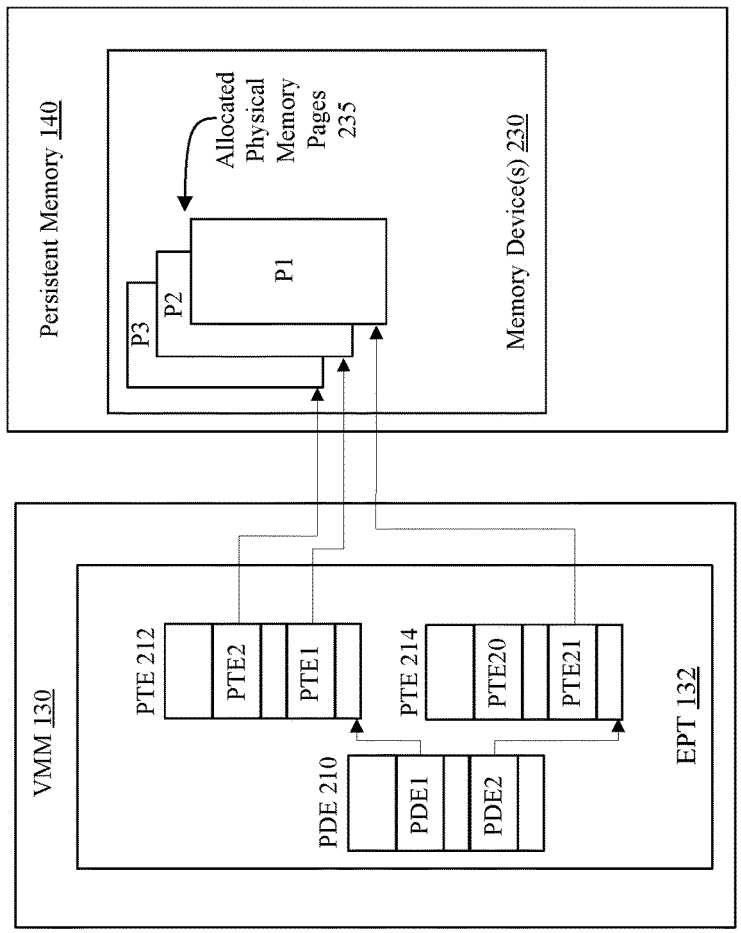
FIG. 2 illustrates an example first extended page table for allocated persistent memory.

FIG. 2 illustrates example allocations 200. In some examples, as shown in FIG. 2, allocations 200 includes a two-level extended page table (EPT) 132. Although this disclosure contemplates use of other multi-level EPTs, for simplicity a two-level EPT is shown and described. The two-level EPT 132 may include page directory entry (PDE) table 210 and page table entry (PTE) tables 212 and 214. According to some examples, VMM 130 may work in cooperation with host OS 110 to create EPT 132 to facilitate direct access to allocated physical memory pages 235 maintained at memory device(s) 230 of persistent memory 140.

According to some examples, as described more below, allocated physical memory pages 235 may include physical blocks of persistent memory 140 for a file based virtual memory residing on a DAS volume. For these examples, allocated physical memory pages 235 may have been directly assigned or allocated to VM 120. The two-level EPT 132 may function as a mapping of virtual logical blocks to physical blocks of persistent memory 140 included within physical memory pages 235. Once physical memory pages 235 are assigned or allocated, elements of VM 120 may use EPT 132 to directly access persistent memory 140 without involvement of VMM 130 or host OS 110 during these direct accesses to persistent memory 140.

Figure 3:
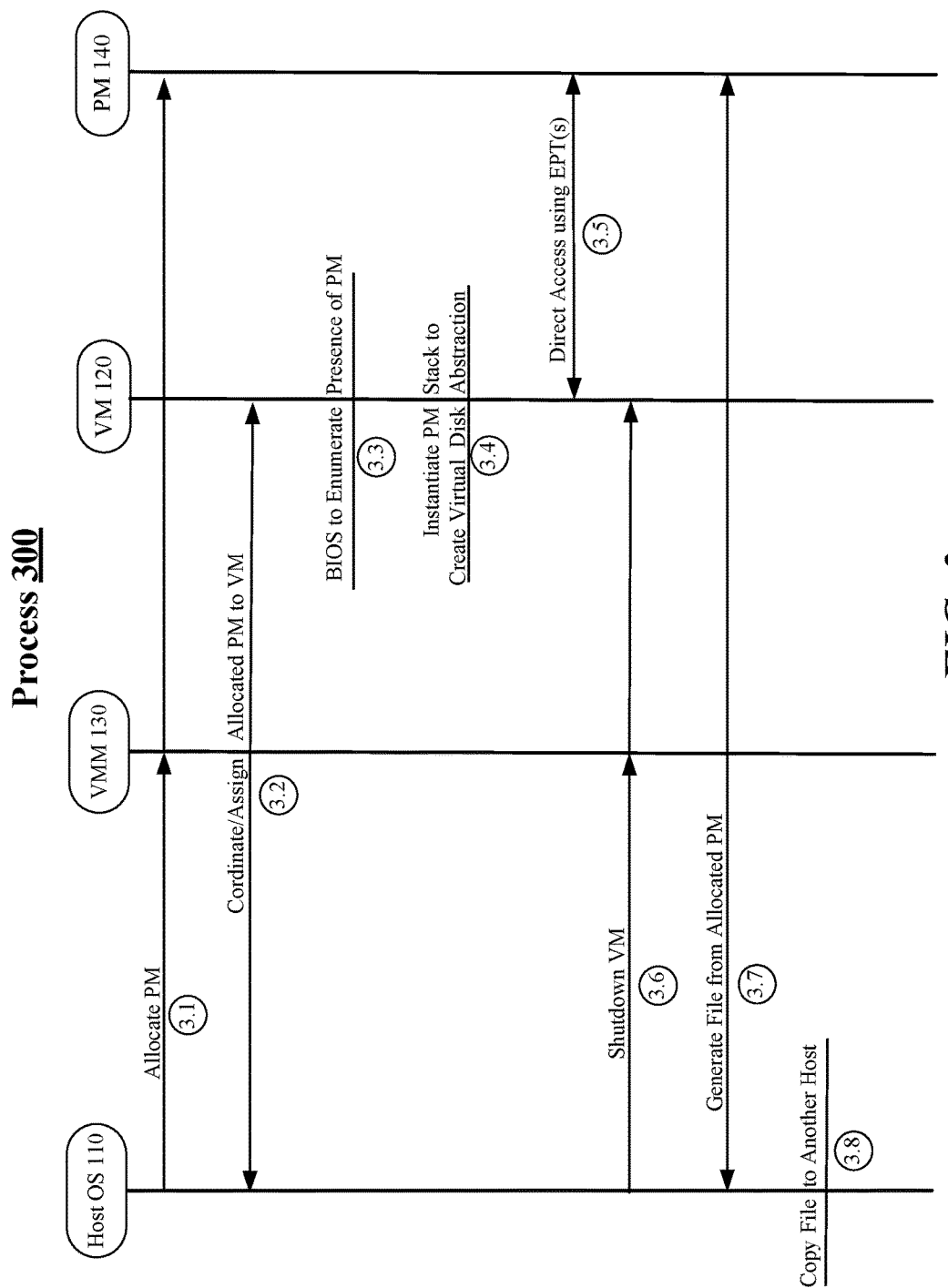
FIG. 3 illustrates an example first process.

FIG. 3 illustrates an example process 300. In some examples, process 300 may be for initiating, using and shutting down a file based virtual memory residing on a DAS volume that is backed by a persistent memory. For these examples, elements of system 100 as shown in FIG. 1 such as host OS 110, VM 120, VMM 130 or persistent memory (PM) 140 may be related to process 300. Allocations 200 as shown in FIG. 2 may also be related to process 300. However, example process 300 is not limited to implementations using elements of system 100 or allocations 200 shown in FIGS. 1-2.

Beginning at process 3.1 (Allocate PM), logic and/or features of host OS 110 may allocate physical blocks and/or pages of PM 140 for use in a file based virtual memory utilized by VMs managed or controlled by VMM 130. In some examples, persistent memory disk driver 114 of host OS 110 may allocate the physical blocks of PM 140. For these examples, allocations of physical blocks of PM 140 may be based on, but is not limited to, available blocks of PM 140 at time of initialization of the VMs managed or controlled by VMM 130.

Moving to process 3.2 (Coordinate/Assign allocated PM to VM), logic and/or features of VMM 130 may coordinate with elements of Host OS 110 to assign allocated PM to VM 120. According to some examples, virtual disk provider 116 may interpret a file based virtual memory for use by elements of VM 120 to determine what physical blocks and/or pages of PM 140 need to be directly allocated to VM 120. VMM 130 may then create one or more EPT tables such as EPT 132 that may map to physical memory pages 235 maintained by one or more memory device(s) 230 of persistent memory 140 to virtual logical blocks of the file based virtual memory interpreted by virtual disk provider 116. EPT 132, for example, may be created according to allocations 200 mentioned above for FIG. 2.

Moving to process 3.3 (BIOS to Enumerate Presence of PM), logic and/or features of VM 120 may include a guest basic input/output system (BIOS) capable of enumerating a presence of PM allocated to VM 120. In some examples, the guest BIOS may be capable of enumerating the presence of PM allocated to VM 120 via VMM 130 indicating presence of an Advanced Configuration and Power Interface (ACPI) table that provides information to enumerate persistent memory that has been allocated to VM 120. The ACPI table may be according to the ACPI specification, version 6.1, published by the Unified Extensible Firmware Interface (UEFI) Forum in January of 2016 ("the ACPI specification"), and/or other derivatives or extensions of the ACPI specification. For example, the memory devices of PM 140 may be maintained on one or more NVDIMMs and the ACPI table may be an NVDIMM firmware interface table (NFIT) that provides information to the guest BIOS. For this example, the guest BIOS may determine that physical memory page(s) 235 of PM 140 have been mapped to virtual logical blocks of the file based virtual memory interpreted by virtual disk provider 116 based on the NFIT.

Moving to process 3.4 (Instantiate PM Stack to Create Virtual Disk Abstraction), logic and/or features of VM 120 such as file system 122 of guest OS kernel 121 may be capable of instantiating a PM stack to create a virtual disk abstraction exposed by the information provided in the ACPI table (e.g., NFIT).

Moving to process 3.5 (Direct Access using EPT(s)), logic and/or features of VM 120 such as persistent memory disk driver 124 of guest OS kernel 121 may be capable of direct access to PM 140 using EPT(s) 132. In some examples, the guest BIOS may setup persistent memory disk driver 124 to use EPT 132 to directly access physical memory page(s) 235 following enumeration of the presence of PM allocated to VM 120. For these examples, requests by file system 122 to access data maintained in virtual logical blocks of a file based virtual memory may be fulfilled by persistent memory disk driver 124 directly accessing PM 140 via use of EPT 132 without a need for further involvement of VMM 130 or host OS 110.

Moving to process 3.6 (Shutdown VM), logic and/or features of VMM 130 and host OS 110 may determine to shut down VM 120. For example, VM 120 may be shutdown to migrate VM 120 to another host computing device.

Moving to process 3.7 (Generate File from Allocated PM), logic and/or features of host OS 110 may generate a file from data maintained in memory page(s) 235 of PM 140. In some examples, once VM 120 is shutdown, the file based virtual memory seen by virtual disk provider 116 and/or file system 112 may be up-to-date since memory page(s) 235 backing the file based virtual memory are the same memory page(s) 235 for the virtual disk abstraction used by file system 122 of guest OS kernel 121 while VM 120 was in operation.

Moving to process 3.8 (Copy File to Another Host), logic and/or features of host OS 110 may copy the file generated from data maintained in memory page(s) 235 of PM 140 to another host computing device. In some examples, once the file is copied, memory page(s) 235 may be re-allocated or re-assigned to another VM.

Figure 4:
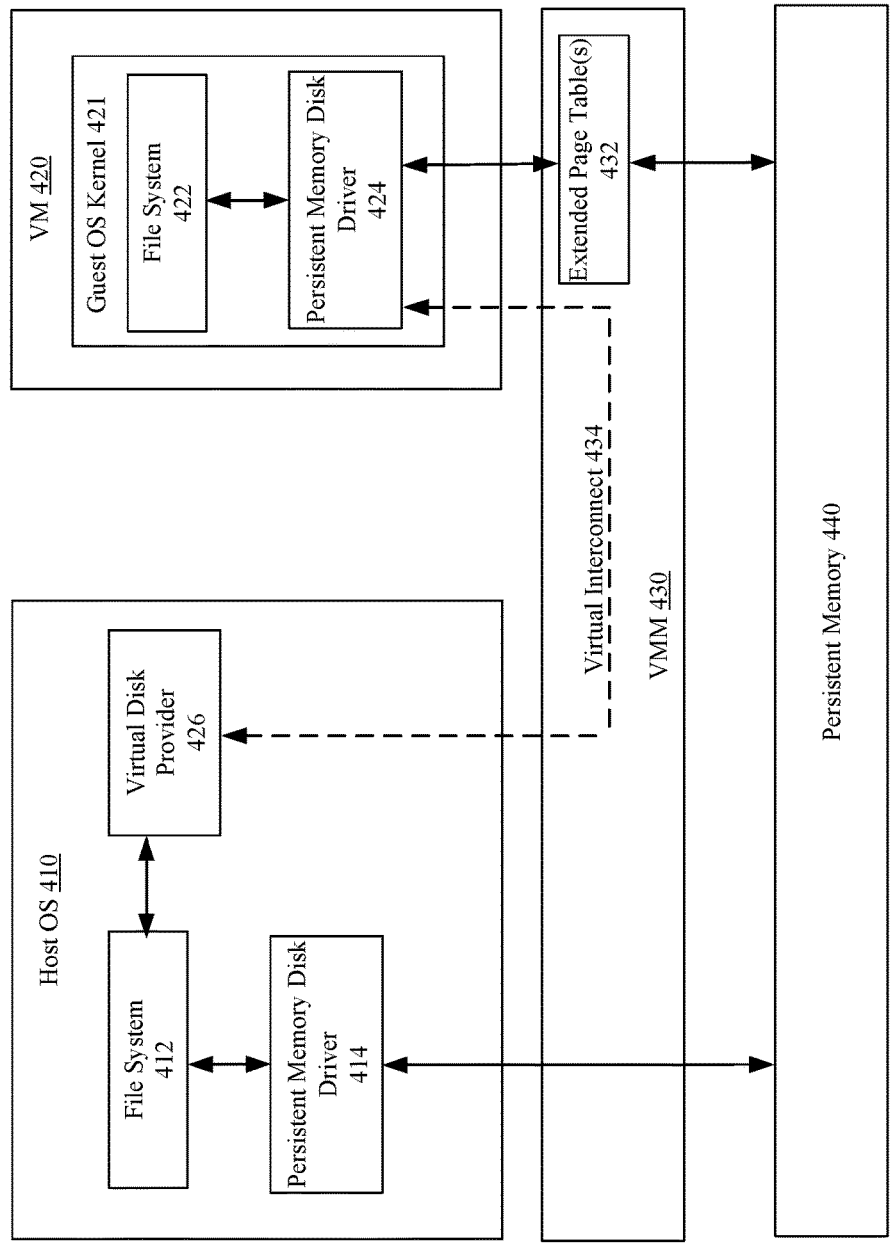
FIG. 4 illustrates an example second system.

FIG. 4 illustrates an example system 400. In some examples, as shown in FIG. 4, system 400 is similar to system 100 shown in FIG. 1 and includes a host OS 410, a VM 420, a VMM 130 and a persistent memory 440. According to some examples, rather than allocating most if not all persistent memory pages backing up a file based virtual memory during initialization of a VM as described above for FIGS. 1-3, the file based virtual memory may be thinly provisioned. In other words, thinly provisioned file based virtual memory supported by system 400 may allocate at least some persistent memory pages on demand.

According to some examples, as shown in FIG. 4, host OS 410 may include a file system 412, a persistent memory disk driver 414 and a virtual disk provider 416. As described in more detail below, these elements of host OS 410 may work in collaboration with VMM 430 to initially directly allocate or assign at least a portion of persistent memory 440 to create a thinly provisioned file based virtual memory for initial use by elements of VM 420. These elements of VM 420 such as a file system 422 and a persistent memory disk driver 424 for guest OS kernel 421 may be capable of directly accessing physical blocks of persistent memory 140 backing the virtual memory through one or more extended page table(s) 432 maintained by VMM 430 to utilize the thinly provisioned file based virtual memory. Similar to system 100, the direct accessing of the physical blocks of persistent memory 440 backing the thinly provisioned file based virtual memory may result in the thinly file based virtual memory residing on a DAS volume. Once the thinly provisioned file based virtual memory residing on the DAS volume is established, direct access by elements of VM 120 may occur without involvement of VMM 130 or host OS 110 for the initially allocated physical memory pages of persistent memory 140. However, as described more below, an on-demand allocation may be communicated via a virtual interconnect 434 between virtual disk provider 426 and persistent memory disk driver 424. Virtual interconnect 434 is shown in FIG. 4 as a dashed line to indicate that the on-demand allocation may be needed for just a first access to a virtual logical block that is to be backed up by the on-demand allocation.

Figure 5:
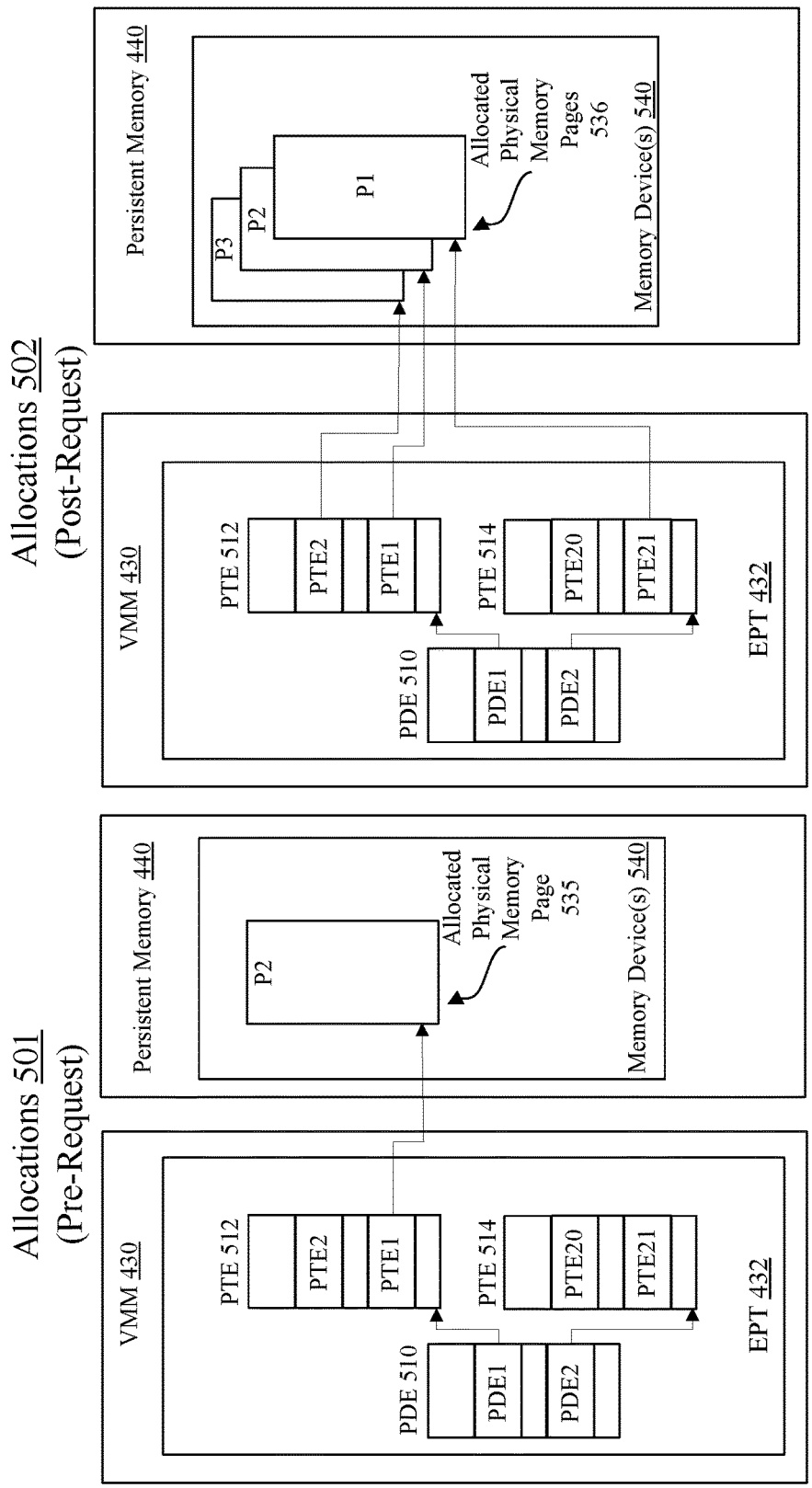
FIG. 5 illustrates an example second extended page table for allocated persistent memory.

FIG. 5 illustrates example allocations 501 and 502. In some examples, as shown in FIG. 5, allocations 501 and 502 may each include a two-level extended page table (EPT) 432 similar to EPT 132 shown in FIG. 2. A two-level EPT 432 may include PDE table 510 and PTE tables 512 and 514. According to allocations 501 (pre-request), VMM 430 may work in cooperation with host OS 410 to create EPT 432 to first facilitate direct access to allocated physical memory page 535 maintained at memory device(s) 430 of persistent memory 440 prior to an on-demand allocation request. VMM 430 may also work in cooperation with host OS 410 to modify or update EPT 432 to then facilitate direct access to additionally allocated physical memory pages 536 after an on-demand allocation request according to allocations 502 (post-request).

According to some examples, as described more below, allocated physical memory page 435 may include physical blocks of persistent memory 440 for a thinly provisioned file based virtual memory residing on a DAS volume. For these examples, allocated physical memory page 435 may have been directly assigned or allocated to VM 120 when initialized. Similar to EPT 132, the two-level EPT 432 may function as a mapping of virtual logical blocks to physical blocks of persistent memory 440 included within physical memory page 535. Once physical memory page 535 is assigned or allocated, elements of VM 120 may use EPT 432 to directly access this physical memory page without involvement of VMM 430 or host 410 during these direct accesses to persistent memory 440.

In some examples, as described more below, allocated physical memory pages 536 may include additional physical blocks of persistent memory 440 for the thinly provisioned file based virtual memory residing on the DAS volume that may be expanded when access to virtual logical blocks not initially mapped in EPT 432 is needed (e.g., by file system 122). For these examples, allocated physical memory pages 536 may include additional physical memory pages that may be directly assigned or allocated to VM 120 on demand. EPT 432 may be updated to map these newly accessed virtual logical blocks to newly allocated physical blocks of persistent memory 440 included within physical memory pages 536 (e.g., P2 and/or P3). Once physical memory pages 536 are assigned or allocated, elements of VM 120 may use the updated EPT 432 to directly access these physical memory pages without involvement of VMM 430 or host 410 during these direct accesses to persistent memory 440.

Figure 6:
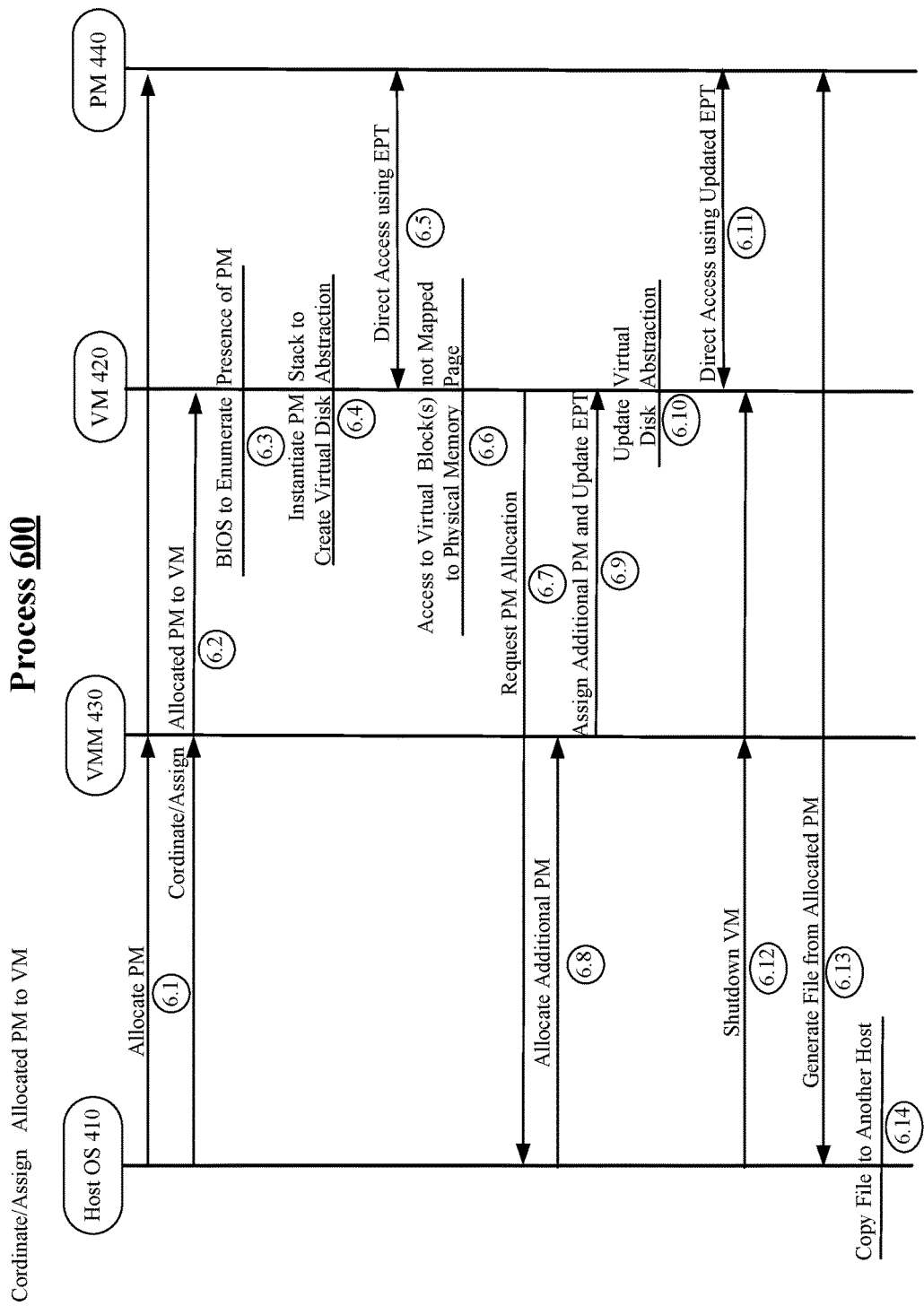
FIG. 6 illustrates an example second process.

FIG. 6 illustrates an example process 600. In some examples, process 600 may be for initiating, using and shutting down a thinly provisioned file based virtual memory residing on a DAS volume that is backed by a persistent memory. For these examples, elements of system 400 as shown in FIG. 4 such as host OS 410, VM 420, VMM 430 or persistent memory (PM) 440 may be related to process 600. Allocations 500 as shown in FIG. 5 may also be related to process 600. However, example process 600 is not limited to implementations using elements of system 400 or allocations 500 shown in FIGS. 4-5.

Beginning at process 6.1 (Allocate PM), logic and/or features of host OS 410 may allocate physical blocks and/or pages of PM 440 for use in a thinly provisioned file based virtual memory utilized by VMs managed or controlled by VMM 430. In some examples, persistent memory disk driver 414 of host OS 410 may allocate the physical blocks of PM 440. For these examples, initial allocations of physical blocks of PM 440 may be based on, but is not limited to, available blocks of PM 440 at time of initialization of the VMs managed or controlled by VMM 430.

Moving to process 6.2 (Coordinate/Assign allocated PM to VM), logic and/or features of VMM 430 may coordinate with elements of Host OS 410 to assign initially allocated PM to VM 420. According to some examples, virtual disk provider 416 may interpret a file based virtual memory for use by elements of VM 420 to determine what physical blocks and/or pages of PM 440 need to be directly allocated to VM 420 upon initialization. VMM 430 may then create one or more EPT tables such as EPT 432 that may map to physical memory page 535 maintained by one or more memory device(s) 530 of persistent memory 440 to virtual logical blocks of the file based virtual memory interpreted by virtual disk provider 416. EPT 432, for example, may be created according to allocations 500 mentioned above for FIG. 5.

Moving to process 6.3 (BIOS to Enumerate Presence of PM), logic and/or features of VM 420 may include a guest BIOS capable of enumerating presence of PM allocated to VM 420. In some examples, the guest BIOS may have be capable of enumerating presence of PM allocated to VM 420 via VMM 430 indicating presence of an ACPI table that provides information to enumerate persistent memory that has been allocated and assigned to VM 420. For examples, the ACPI table may be according to the ACPI specification and memory devices of PM 440 may be maintained on one or more NVDIMMs and the ACPI table may be an NFIT that provides information to the guest BIOS. For this example, the guest BIOS may determine that physical memory page 535 of PM 440 has been mapped to virtual logical blocks of the file based virtual memory interpreted by virtual disk provider 416 based on the NFIT.

Moving to process 6.4 (Instantiate PM Stack to Create Virtual Disk Abstraction), logic and/or features of VM 420 such as file system 422 of guest OS kernel 421 may be capable of instantiating a PM stack to create a virtual disk abstraction exposed by the information provided in the ACPI table (e.g., NFIT).

Moving to process 6.5 (Direct Access using EPT), logic and/or features of VM 420 such as persistent memory disk driver 424 of guest OS kernel 421 may be capable of direct access to PM 440 using EPT 432. In some examples, the guest BIOS may setup persistent memory disk driver 424 to use EPT 432 to directly access physical memory page 535 following enumeration of the presence of PM allocated to VM 420. For these examples, requests by file system 422 to access data maintained in virtual logical blocks of a file based virtual memory may be fulfilled by persistent memory disk driver 424 directly accessing PM 440 via use of EPT 432 without a need for further involvement of VMM 430 or host OS 410 as long as those virtual logical blocks are mapped to physical memory page 535.

Moving to process 6.6 (Access to Virtual Block(s) not Mapped to Physical Memory Page), file system 422 may request access to one or more virtual logical blocks not physically mapped to physical memory page 535. In other words, memory pages from PM 440 have yet to be allocated to VM 420 for direct access.

Moving to process 6.7 (Request PM Allocation), logic and/or features of VM 420 may place a request to host OS 410 for an on-demand allocation of additional memory pages. In some examples, the request may be made through virtual interconnect 434 between virtual disk provider 416 and persistent memory disk driver 424.

Moving to process 6.8 (Allocate Additional PM), logic and/or features of host OS 410 may indicate an allocation of additional PM to VMM 430 that includes memory pages 536.

Moving to process 6.9 (Assign Additional PM and Update EPT), logic and/or features of VMM 430 may update EPT 432 that may map the virtual logical block(s) to the newly allocated PM that includes memory pages 536.

Moving to process 6.10 (Update Virtual Disk Abstraction), logic and/or features of VM 420 such as file system 422 may update the virtual disk abstraction based on the updated EPT.

Moving to process 6.11 (Direct Access using Updated EPT), logic and/or features of VM 420 such as persistent memory disk driver 424 of guest OS kernel 421 may be capable of direct access to PM 440 using updated EPT 432. For these examples, requests by file system 422 to access data maintained in virtual logical blocks of a thinly provisioned file based virtual memory may be fulfilled by persistent memory disk drive 424 directly accessing PM 440 via use of the updated EPT 432 without a need for further involvement of VMM 430 or host OS 410 as long as those virtual logical blocks are mapped to physical memory pages 536.

Moving to process 6.12 (Shutdown VM), logic and/or features of VMM 430 and host OS 410 may determine to shut down VM 420. For example, VM 420 may be shutdown to migrate VM 420 to another host computing device.

Moving to process 6.13 (Generate File from Allocated PM), logic and/or features of host OS 410 may generate a file from data maintained in memory page(s) 535 of PM 440. In some examples, once VM 420 is shutdown, the file based virtual memory seen by virtual disk provider 416 and/or file system 412 may be up-to-date since memory pages 536 backing the thinly provisioned file based virtual memory are the same memory pages for the virtual disk abstraction used by file system 422 of guest OS kernel 421 while VM 420 was in operation.

Moving to process 6.14 (Copy File to Another Host), logic and/or features of host OS 410 may copy the file generated from data maintained in memory pages 536 of PM 440 to another host computing device. In some examples, once the file is copied, memory pages 536 may be re-allocated or re-assigned to another VM. The process may then come to an end.

Figure 7:
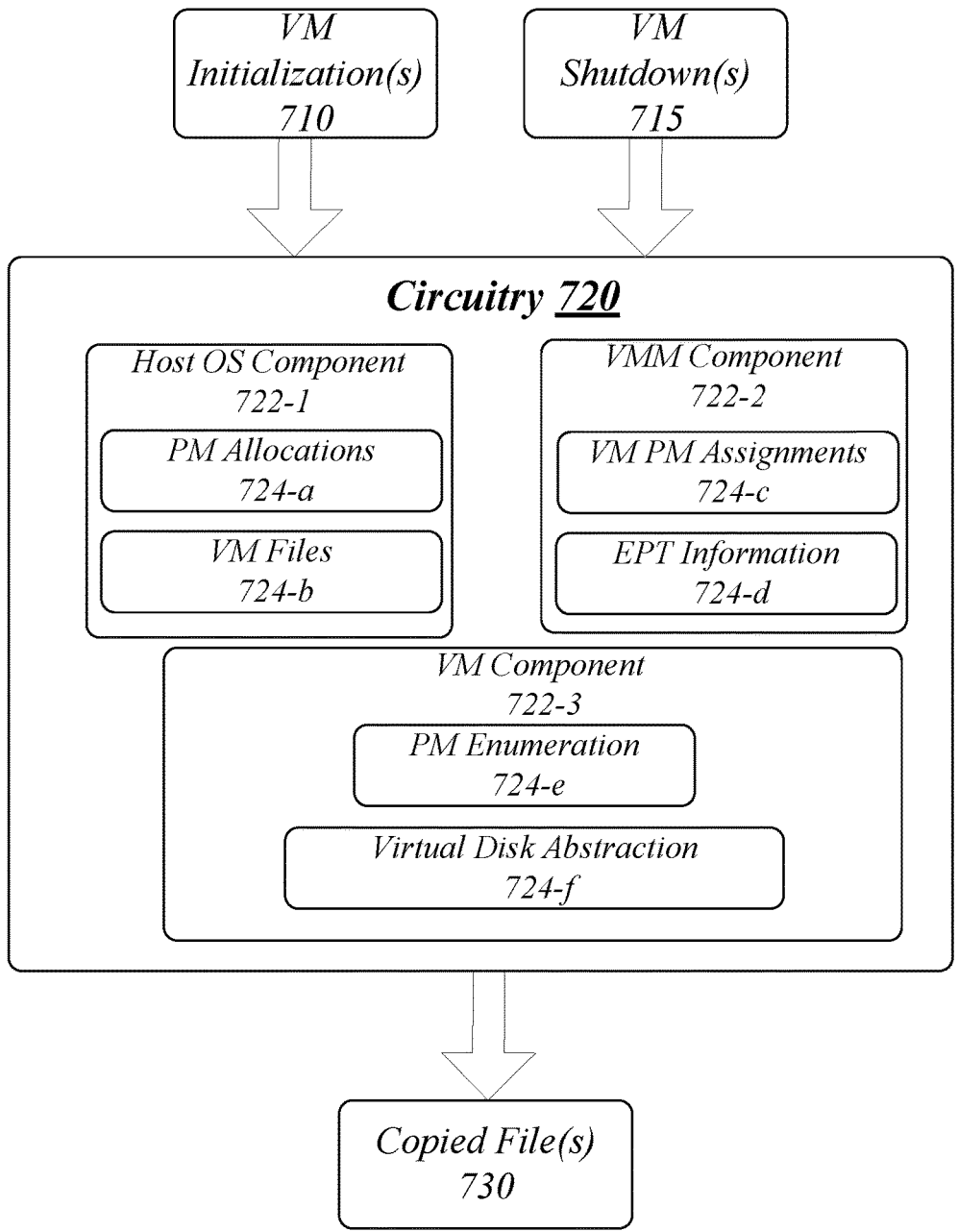
FIG. 7 illustrates an example apparatus.

FIG. 7 illustrates an example block diagram for an apparatus 700. Although apparatus 700 shown in FIG. 7 has a limited number of elements in a certain topology, it may be appreciated that the apparatus 700 may include more or less elements in alternate topologies as desired for a given implementation.

The apparatus 700 may be supported by circuitry 720 and may be maintained or located at a host computing device and may be arranged to execute or implement elements of a system such as system 100 or system 400 shown in FIG. 1 or 4 and described above. Circuitry 720 may be arranged to execute one or more software or firmware implemented components or logic 722-*a*. It is worthy to note that "a" and "b" and "c" and similar designators as used herein are intended to be variables representing any positive integer. Thus, for example, if an implementation sets a value for a=3, then a complete set of software or firmware for components or logic 722-*a* may include components or logic 722-1, 722-2 or 722-3. The examples presented are not limited in this context and the different variables used throughout may represent the same or different integer values. Also, these "components" or "logic" may be software/firmware stored in computer-readable media, and although the components are shown in FIG. 7 as discrete boxes, this does not limit these components to storage in distinct computer-readable media components (e.g., a separate memory, etc.).

According to some examples, circuitry 720 may include a processor or processor circuitry to implement logic and/or features that may initiate, use and shut down a file based virtual memory residing on a DAS volume that is backed by a persistent memory. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 720 may also be an application specific integrated circuit (ASIC) and at least some components or logic 722-*a* may be implemented as hardware elements of the ASIC. In some examples, circuitry 720 may also include a field programmable gate array (FPGA) and at least some logic 722-*a* may be implemented as hardware elements of the FPGA.

According to some examples, apparatus 700 may include a host OS component 722-1. Host OS component 722-1 may be executed by circuitry 720 to allocate persistent memory maintained at one or more memory devices coupled with the host computing device to one or more VMs hosted by the host computing device based on respective file based virtual memory to be used by the one or more VMs. For these examples, the allocation of persistent memory may be responsive to VM initialization(s) 710. PM allocations 724-*a* may be maintained by Host OS component 722-1 (e.g., in a data structure such as a lookup table (LUT)) to track what portions of persistent memory have been allocated to VMs hosted by a computing device that includes apparatus 700.

In some examples, apparatus 700 may also include a VMM component 722-2. VMM component 722-2 may be executed by circuitry 720 to assign at least a portion of the allocated persistent memory to a VM from among the one or more VMs by creating an EPT to map at least one physical memory page maintained by at least one of the memory devices to first virtual logical blocks of a file based virtual memory to be used by the VM. For these examples, VM PM assignments 724-*c* may be maintained by VMM component 722-2 to track what portions of allocated persistent memory have been assigned to which of the one or more VMs. In some examples, VM PM assignments 724-*c* may include ACPI tables such as NFITs for use by the one or more VMs to enumerate persistent memory allocated and assigned to the one or more VMs. Also, EPT information 724-*d* may be maintained by VMM component 722-2 and may include the created EPT for the VM from among the one or more VMs.

VM PM assignments 724-*c* or EPT information 724-*d* may be maintain in a data structure such as LUT that may be accessible to other components of circuitry 720. For example, at least some information included in EPT information 724-*d* may be accessible to elements of the VM to access the created EPT.

According to some examples, apparatus 700 may also include a VM component 722-3. VM component 722-3 may be executed by circuitry 720 to enumerate or determine a presence of the assigned allocated persistent memory for the VM (e.g., based on information provided in an ACPI table such as an NFIT), create a virtual disk abstraction for the file based virtual memory and enable the VM to use the EPT to directly access the assigned allocated persistent memory.

In some examples, VM component 722-3 may include a guest BIOS (not shown). The guest BIOS may be capable of enumerating the presence of the assigned allocated persistent memory. VM component 722-3 may maintain PM enumeration 724-*e* (e.g., in a LUT) and store the enumeration information for the assigned allocated persistent memory in PM enumeration 742-*e*.

According to some examples, VM component 722-3 may also include a guest OS kernel (not shown) capable of creating the virtual disk abstraction for the file based virtual memory. VM component 722-3 may maintain the created virtual disk abstraction with virtual disk abstraction 724-*f* (e.g., in a LUT). The guest OS kernel may also have access to EPT information 724-*d* maintained by VMM component 722-2 to use the EPT created for the VM in order to directly access the assigned allocated persistent memory.

In some examples, VMM component 722-2 may cause the VM hosted by the computing device including apparatus 700 to shut down responsive to VM shutdown(s) 715. The reason for the shutdown may be to migrate the VM to another or second host computing device. For these examples host OS component 722-1 may generate a file from data stored to the assigned allocated persistent memory. This file may be at least temporarily maintained with VM files 724-*b* (e.g., to a data structure stored to system memory). Host OS component 722-1 may then cause a copy of the file to be stored at a second host computing device arranged to support the VM via copied file(s) 730. The copied file included in copied file(s) 730 may enable the VM to resume operation on the second host computing device while maintaining the same operating state prior to being shut down at the host computing device that includes apparatus 700.

According to some examples, the file based virtual memory for use by the VM may be a thinly provisioned file based virtual memory (e.g., as described for process 600). VM component 722-3 may request an additional allocation of persistent memory responsive to the VM accessing second virtual logical blocks not mapped to the at least one physical memory page maintained by at least one of the memory devices. For these examples, VMM component 722-2 may receive an indication that host OS component 722-1 has allocated the additional persistent memory responsive to the request. VMM component 722-2 may then assign the additional allocation of persistent memory to the VM and update the EPT to map at least one additional physical memory page maintained by the at least one of the memory devices to the second virtual logical blocks of the thinly provisioned filed based virtual memory. VM component 722-3 may then update the virtual disk abstraction for the thinly provisioned file based virtual memory and enable the VM to use the updated EPT to directly access the assigned additionally allocated persistent memory.

FIG. 8 illustrates an example logic flow 800. As shown in FIG. 8 the first logic flow includes a logic flow 800. Logic flow 800 may be representative of some or all of the operations executed by one or more logic, features, or devices described herein, such as apparatus 700. More particularly, logic flow 800 may be implemented by host OS component 722-1, VMM component 722-2 or VM component 722-3.

According to some examples, logic flow 800 at block 802 may receive an allocation of persistent memory maintained at one or more memory devices coupled with a host computing device, the persistent memory allocated to one or more VMs hosted by the host computing device based on respective file based virtual memory to be used by the one or more VMs. For these examples, VMM component 722-2 may have received the allocation from host OS component 722-1.

In some examples, logic flow 800 at block 804 may assign at least a portion of the allocated persistent memory to a VM from among the one or more VMs by creating an EPT to map at least one physical memory page maintained by at least one of the memory devices to first virtual logical blocks of a file based virtual memory to be used by the VM. For these example, VMM component 722-2 may assign the allocated persistent memory to the VM and create the EPT.

According to some examples, logic flow 800 at block 806 may provide information to the VM for the VM to enumerate a presence of the assigned allocated persistent memory, create a virtual disk abstraction for the file based virtual memory and use the EPT to directly access the assigned allocated persistent memory. For these examples, VMM component 722-2 may provide the information to VM component 722-3 (e.g., in an ACPI table such as an NFIT). VM component 722-3 may enumerate the presence of the assigned allocated persistent memory, create a virtual disk abstraction for the file based virtual memory and use the EPT to directly access the assigned allocated persistent memory.

In some examples, logic flow 800 at block 808 may cause the VM to shut down. For these examples, VMM component 722-2 may cause the VM to shut down.

According to some examples, logic flow 800 at block 810 may generate a file from data stored to the assigned allocated persistent memory. For these examples, host OS component 722-1 may generate the file.

In some examples, logic flow 800 at block 812 may copy the file to a second host computing device arranged to support the VM. For these examples, host OS component 722-1 may copy the file.

FIG. 9 illustrates an example storage medium 900. As shown in FIG. 9, the first storage medium includes a storage medium 900. The storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
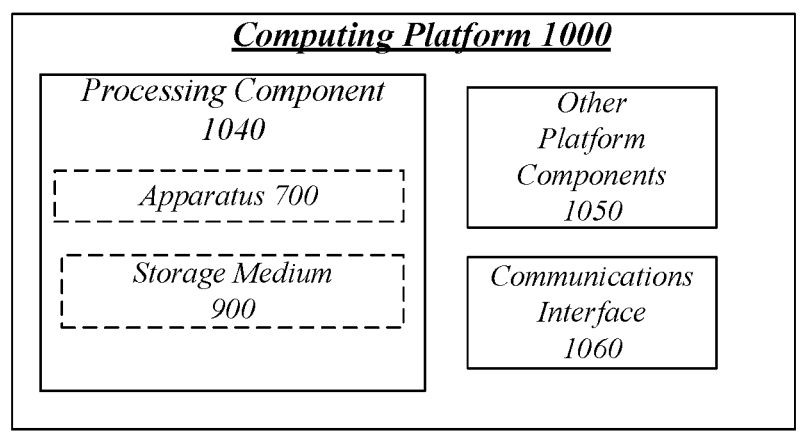
FIG. 10 illustrates an example computing platform.

FIG. 10 illustrates an example computing platform 1000. In some examples, as shown in FIG. 10, computing platform 1000 may include a processing component 1040, other platform components 1050 or a communications interface 1060. According to some examples, computing platform 1000 may be a host computing device capable of hosting or supporting one or more VMs.

According to some examples, processing component 1040 may execute processing operations or logic for apparatus 700 and/or storage medium 900. Processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), RAM, DRAM, DDR DRAM, synchronous DRAM (SDRAM), DDR SDRAM, SRAM, programmable ROM (PROM), EPROM, EEPROM, flash memory, ferroelectric memory, SONOS memory, polymer memory such as ferroelectric polymer memory, nanowire, FeTRAM or FeRAM, ovonic memory, phase change memory, memristors, STT-MRAM, magnetic or optical cards, an array of devices such as Redundant Array of Independent Disks (RAID) drives, solid state memory devices (e.g., USB memory), solid state drives (SSD) and any other type of storage media suitable for storing information. In some examples, these types of memory units may be arranged as persistent memory and may be maintained in one or more DIMMs.

In some examples, communications interface 1060 may include logic and/or features to support a communication interface. For these examples, communications interface 860 may include one or more communication interfaces that operate according to various communication protocols or standards to communicate over direct or network communication links. Direct communications may occur via use of communication protocols such as SMBus, PCIe, NVMe, QPI, SATA, SAS or USB communication protocols. Network communications may occur via use of communication protocols or standards related to IEEE 802.3, iWARP, Infiniband, RoCE, SATA, SCSI, SAS. Network communication may also occur according to one or more OpenFlow specifications such as the OpenFlow Hardware Abstraction API Specification.

Computing platform 1000 may be part of a host computing device that may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1000 described herein, may be included or omitted in various embodiments of computing platform 1000, as suitably desired.

The components and features of computing platform 1000 may be implemented using any combination of discrete circuitry, ASICs, logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic", "feature", "component", "circuit" or "circuitry."

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry at a host computing device. The apparatus may also include a host OS component for execution by the circuitry to allocate persistent memory maintained at one or more memory devices coupled with the host computing device to one or more VMs hosted by the host computing device based on respective file based virtual memory to be used by the one or more VMs. The apparatus may also include a VMM component for execution by the circuitry to assign at least a portion of the allocated persistent memory to a VM from among the one or more VMs by creating an EPT to map at least one physical memory page maintained by at least one of the memory devices to first virtual logical blocks of a file based virtual memory to be used by the VM. The apparatus may also include a VM component for execution by the circuitry to enumerate a presence of the assigned allocated persistent memory for the VM based on the EPT, create a virtual disk abstraction for the file based virtual memory and enable the VM to use the EPT to directly access the assigned allocated persistent memory.

Example 2

The apparatus of example 1 may include the VMM component to cause the VM to shut down. For these examples, the host OS component may generate a file from data stored to the assigned allocated persistent memory. The host OS component may also cause a copy of the file to be stored at a second host computing device arranged to support the VM.

Example 3

The apparatus of example 1, the VM component may include a guest BIOS capable of enumerating the presence of the assigned allocated persistent memory based on information provided by the VMM component.

Example 4

The apparatus of example 3, the one or more memory devices may include non-volatile memory maintained on at least one NVDIMM coupled with the host computing device. For these examples, the information provided by the VMM component may include information in an NFIT arranged based on the ACPI specification, version 6.1.

Example 5. The apparatus of example 1, the VM component may include a guest OS kernel capable of creating the virtual disk abstraction for the file based virtual memory and using the EPT to directly access the assigned allocated persistent memory.

Example 6

The apparatus of example 1 may also include the VM component to request an additional allocation of persistent memory responsive to the VM accessing second virtual logical blocks not mapped to the at least one physical memory page. The VMM component may receive an indication that the host OS component has allocated the additional persistent memory responsive to the request. The VMM component may assign the additional allocation of persistent memory to the VM. The VMM component may update the EPT to map at least one additional physical memory page maintained by the at least one of the memory devices to the second virtual logical blocks of the file based virtual memory. The VM component may update the virtual disk abstraction for the file based virtual memory and may enable the VM to use the updated EPT to directly access the assigned additionally allocated persistent memory.

Example 7

The apparatus of example 1, the persistent memory maintained at the one or more memory devices comprises the persistent memory capable of storing data structures such that the data structures continue to be accessible after the data structures are created and following a power loss to the one or more memory devices.

Example 8

The apparatus of example 1, the one or more memory devices may be maintained on at least one DIMM coupled with the host computing device.

Example 9

The apparatus of example 1, the one or more memory devices may include volatile or non-volatile memory.

Example 10

The apparatus of example 9, the volatile memory may include RAM, D-RAM, DDR SDRAM, SRAM, T-RAM or Z-RAM.

Example 11

The apparatus of example 9, the non-volatile memory may include phase change memory that uses chalcogenide phase change material, flash memory, ferroelectric memory, SONOS memory, polymer memory, ferroelectric polymer memory, FeTRAM, FeRAM, ovonic memory, nanowire, EEPROM, phase change memory, memristors or STT-MRAM.

Example 12

The apparatus of example 1 may also include one or more of: a network interface communicatively coupled to the apparatus; a battery coupled to the apparatus; or a display communicatively coupled to the apparatus.

Example 13

An example method may include receiving, by circuitry at a host computing device, an allocation of persistent memory maintained at one or more memory devices coupled with the host computing device. For these examples, the persistent memory may be allocated to one or more VMs hosted by the host computing device based on respective file based virtual memory to be used by the one or more VMs. The method may also include assigning at least a portion of the allocated persistent memory to a VM from among the one or more VMs by creating an EPT to map at least one physical memory page maintained by at least one of the memory devices to first virtual logical blocks of a file based virtual memory to be used by the VM. The method may also include providing information to the VM for the VM to enumerate a presence of the assigned allocated persistent memory, create a virtual disk abstraction for the file based virtual memory and use the EPT to directly access the assigned allocated persistent memory.

Example 14

The method of example 13 may also include causing the VM to shut down. The method may also include generating a file from data stored to the assigned allocated persistent memory. The method may also include copying the file to a second host computing device arranged to support the VM.

Example 15

The method of example 13, the persistent memory may be allocated by a host OS for the host computing device.

Example 16

The method of example 15, the VM including a guest BIOS capable of enumerating the presence of the assigned allocated persistent memory based on the information provided to the VM.

Example 17

The method of example 16, the one or more memory devices includes non-volatile memory maintained on at least one NVDIMM coupled with the host computing device. For these examples, the information provided by to the VM may include information include in an NFIT arranged based on the ACPI specification, version 6.1.

Example 18

The method of example 16, the VM may include a guest OS kernel capable of creating the virtual disk abstraction for the file based virtual memory and using the EPT to directly access the assigned allocated persistent memory.

Example 19

The method of example 13 may also include receiving an additional allocation of persistent memory responsive to the VM accessing second virtual logical blocks not mapped to the at least one physical memory page. The method may also include assigning the additional allocation of persistent memory to the VM. The method may also include updating the EPT to map at least one additional physical memory page maintained by the at least one of the memory devices to the second virtual logical blocks of the file based virtual memory. The method may also include providing the updated EPT to the VM for the VM to update the virtual disk abstraction for the file based virtual memory and for the VM to use the updated EPT to directly access the assigned additionally allocated persistent memory.

Example 20

The method of example 13, the persistent memory maintained at the one or more memory devices may include the persistent memory being capable of storing data structures such that the data structures continue to be accessible after the data structures are created and following a power loss to the one or more memory devices.

Example 21

The method of example 13, the one or more memory devices may be maintained on at least one DIMM coupled with the host computing device.

Example 24

The method of example 13, the one or more memory devices may include volatile or non-volatile memory.

Example 23

The method of example 22, the volatile memory may include (may include RAM, D-RAM, DDR SDRAM, SRAM, T-RAM or Z-RAM.

Example 24

The method of example 22, the non-volatile memory may include phase change memory that uses chalcogenide phase change material, flash memory, ferroelectric memory, SONOS memory, polymer memory, ferroelectric polymer memory, FeTRAM, FeRAM, ovonic memory, nanowire, EEPROM, phase change memory, memristors or STT-MRAM.

Example 25

An example at least one machine readable medium may include a plurality of instructions that in response to being executed by a system that may cause the system to carry out a method according to any one of examples 13 to 24.

Example 26

An apparatus may include means for performing the methods of any one of examples 13 to 24.

Example 27

An example at least one machine readable medium may include a plurality of instructions that in response to being executed by a system at a host computing device may cause the system to receive an allocation of persistent memory maintained at one or more memory devices coupled with the host computing device. For these examples, the persistent memory allocated to one or more VMs hosted by the host computing device based on respective file based virtual memory to be used by the one or more VMs. The instructions may also cause the system to assign at least a portion of the allocated persistent memory to a VM from among the one or more VMs by creating an EPT to map at least one physical memory page maintained by at least one of the memory devices to first virtual logical blocks of a file based virtual memory to be used by the VM. The instructions may also cause the system to provide information to the VM for the VM to enumerate a presence of the assigned allocated persistent memory, create a virtual disk abstraction for the file based virtual memory and use the EPT to directly access the assigned allocated persistent memory.

Example 28

The at least one machine readable medium of example 27, the instructions may further cause the system to cause the VM to shut down. The instructions may also cause the system to generate a file from data stored to the assigned allocated persistent memory. The instructions may also cause the system to copy the file to a second host computing device arranged to support the VM.

Example 29

The at least one machine readable medium of example 27, the persistent memory may be allocated by a host OS for the host computing device.

Example 30

The at least one machine readable medium of example 29, the VM may include a guest BIOS capable of enumerating the presence of the assigned allocated persistent memory based on the information provided to the VM.

Example 31

The at least one machine readable medium of example 30, the one or more memory devices may include non-volatile memory maintained on at least one NVDIMM coupled with the host computing device. For these examples, the information provided by to the VM may include information include in an NFIT arranged based on the ACPI specification, version 6.1.

Example 32

The at least one machine readable medium of example 30, the VM may include a guest OS kernel capable of creating the virtual disk abstraction for the file based virtual memory and using the EPT to directly access the assigned allocated persistent memory.

Example 33

The at least one machine readable medium of example 27, the instructions may further cause the system to receive an additional allocation of persistent memory responsive to the VM accessing second virtual logical blocks not mapped to the at least one physical memory page, The instructions may also cause the system to assign the additional allocation of persistent memory to the VM. The instructions may also cause the system to update the EPT to map at least one additional physical memory page maintained by the at least one of the memory devices to the second virtual logical blocks of the file based virtual memory. The instructions may also cause the system to provide the updated EPT to the VM for the VM to update the virtual disk abstraction for the file based virtual memory and for the VM to use the updated EPT to directly access the assigned additionally allocated persistent memory.

Example 34

The at least one machine readable medium of example 27, the persistent memory maintained at the one or more memory devices may include the persistent memory capable of storing data structures such that the data structures continue to be accessible after the data structures are created and following a power loss to the one or more memory devices.

Example 35

The at least one machine readable medium of example 27, the one or more memory devices maintained on at least one DIMM coupled with the host computing device.

Example 36

The at least one machine readable medium of example 27, the one or more memory devices may include volatile or non-volatile memory.

Example 37

The at least one machine readable medium of example 36, the volatile memory may include RAM, D-RAM, DDR SDRAM, SRAM, T-RAM or Z-RAM.

Example 38

The at least one machine readable medium of example 36, the non-volatile memory may include phase change memory that uses chalcogenide phase change material, flash memory, ferroelectric memory, SONOS memory, polymer memory, ferroelectric polymer memory, FeTRAM, FeRAM, ovonic memory, nanowire, EEPROM, phase change memory, memristors or STT-MRAM.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. An apparatus comprising:
   circuitry at a host computing device;
   a host operating system (OS) component for execution by the circuitry to allocate persistent memory maintained at one or more memory devices coupled with the host computing device to one or more virtual machines (VMs) hosted by the host computing device based on respective file based virtual memory to be used by the one or more VMs;
   a VMM component for execution by the circuitry to assign at least a portion of the allocated persistent memory to a VM from among the one or more VMs by creation of an extended page table (EPT) to map at least one physical memory page maintained by at least one of the memory devices to first virtual logical blocks of a file based virtual memory to be used by the VM; and
   a VM component for execution by the circuitry to enumerate a presence of the assigned allocated persistent memory for the VM, create a virtual disk abstraction for the file based virtual memory and enable the VM to use the EPT to directly access the assigned allocated persistent memory, wherein responsive to the VM accessing second virtual logical blocks not mapped to the at least one physical memory page causes:
   the VM component to request an additional allocation of persistent memory;

the VMM component to receive an indication that the host OS component has allocated the additional persistent memory responsive to the request;

the VMM component to assign the additional allocation of persistent memory to the VM;

the VMM component to update the EPT to map at least one additional physical memory page maintained by the at least one of the memory devices to the second virtual logical blocks of the file based virtual memory; and the VM component to update the virtual disk abstraction for the file based virtual memory and enable the VM to use the updated EPT to directly access the assigned additionally allocated persistent memory.

2. The apparatus of claim 1, comprising:

the VMM component to cause the VM to shut down;

the host OS component to generate a file from data stored to the assigned allocated persistent memory and the assigned additionally allocated persistent memory; and the host OS component to cause a copy of the file to be stored at a second host computing device arranged to support the VM.

3. The apparatus of claim 1, the persistent memory maintained at the one or more memory devices comprises the persistent memory capable to store data structures such that the data structures continue to be accessible after the data structures are created and following a power loss to the one or more memory devices.

4. The apparatus of claim 1, the one or more memory devices maintained on at least one dual in-line memory module (DIMM) coupled with the host computing device.

5. The apparatus of claim 1, wherein the one or more memory devices include volatile or non-volatile memory, the volatile memory including random-access memory (RAM), Dynamic RAM (D-RAM), double data rate synchronous dynamic RAM (DDR SDRAM), static random-access memory (SRAM), thyristor RAM (T-RAM) or zero-capacitor RAM (Z-RAM) and the non-volatile memory including phase change memory that uses chalcogenide phase change material, flash memory, ferroelectric memory, silicon-oxide-nitride-oxide-silicon (SONOS) memory, polymer memory, ferroelectric polymer memory, ferroelectric transistor random access memory (FeTRAM or FeRAM), ovonic memory, nanowire, electrically erasable programmable read-only memory (EEPROM), phase change memory, memristors or spin transfer torque-magnetoresistive random access memory (STT-MRAM).

6. The apparatus of claim 1, comprising one or more of:

a network interface communicatively coupled to the apparatus;

a battery coupled to the apparatus; or a display communicatively coupled to the apparatus.

7. A method comprising:

receiving, by circuitry at a host computing device, an allocation of persistent memory maintained at one or more memory devices coupled with the host computing device, the persistent memory allocated to one or more virtual machines (VMs) hosted by the host computing device based on respective file based virtual memory to be used by the one or more VMs;

assigning at least a portion of the allocated persistent memory to a VM from among the one or more VMs by creating an extended page table (EPT) to map at least one physical memory page maintained by at least one of the memory devices to first virtual logical blocks of a file based virtual memory to be used by the VM;

providing information to the VM for the VM to enumerate a presence of the assigned allocated persistent memory, create a virtual disk abstraction for the file based virtual memory and use the EPT to directly access the assigned allocated persistent memory;

receiving an additional allocation of persistent memory responsive to the VM accessing second virtual logical blocks not mapped to the at least one physical memory page;

assigning the additional allocation of persistent memory to the VM;

updating the EPT to map at least one additional physical memory page maintained by the at least one of the memory devices to the second virtual logical blocks of the file based virtual memory; and providing the updated EPT to the VM for the VM to update the virtual disk abstraction for the file based virtual memory and for the VM to use the updated EPT to directly access the assigned additionally allocated persistent memory.

8. The method of claim 7, comprising:

causing the VM to shut down;

generating a file from data stored to the assigned allocated persistent memory and the assigned additionally allocated persistent memory; and copying the file to a second host computing device arranged to support the VM.

9. The method of claim 7, comprising the persistent memory allocated by a host operating system (OS) for the host computing device.

10. The method of claim 9, comprising the VM including a guest basic input/output system (BIOS) capable of enumerating the presence of the assigned allocated persistent memory based on the information provided to the VM.

11. The method of claim 10, the one or more memory devices includes non-volatile memory maintained on at least one non-volatile dual in-line memory module (NVDIMM) coupled with the host computing device, wherein the information provided to the VM comprises information include in an NVDIMM firmware interface table (NFIT) arranged based on the ACPI specification, version 6.1.

12. The method of claim 10, comprising the VM including a guest OS kernel capable of creating the virtual disk abstraction for the file based virtual memory and using the EPT to directly access the assigned allocated persistent memory.

13. The method of claim 7, the persistent memory maintained at the one or more memory devices comprises the persistent memory capable of storing data structures such that the data structures continue to be accessible after the data structures are created and following a power loss to the one or more memory devices.

14. The method of claim 7, wherein the one or more memory devices include volatile or non-volatile memory, the volatile memory including random-access memory (RAM), Dynamic RAM (D-RAM), double data rate synchronous dynamic RAM (DDR SDRAM), static random-access memory (SRAM), thyristor RAM (T-RAM) or zero-capacitor RAM (Z-RAM) and the non-volatile memory including phase change memory that uses chalcogenide phase change material, flash memory, ferroelectric memory, silicon-oxide-nitride-oxide-silicon (SONOS) memory, polymer memory, ferroelectric polymer memory, ferroelectric transistor random access memory (FeTRAM or FeRAM), ovonic memory, nanowire, electrically erasable programmable read-only memory (EEPROM), phase change memory, memristors or spin transfer torque-magnetoresistive random access memory (STT-MRAM).

15. At least one non-transitory machine readable medium comprising a plurality of instructions that in response to being executed by a system at a host computing device cause the system to:

receive an allocation of persistent memory maintained at one or more memory devices coupled with the host computing device, the persistent memory allocated to one or more virtual machines (VMs) hosted by the host computing device based on respective file based virtual memory to be used by the one or more VMs;

assign at least a portion of the allocated persistent memory to a VM from among the one or more VMs by creating an extended page table (EPT) to map at least one physical memory page maintained by at least one of the memory devices to first virtual logical blocks of a file based virtual memory to be used by the VM;

provide the EPT to the VM for the VM to enumerate a presence of the assigned allocated persistent memory, create a virtual disk abstraction for the file based virtual memory and use the EPT to directly access the assigned allocated persistent memory;

receive an additional allocation of persistent memory responsive to the VM accessing second virtual logical blocks not mapped to the at least one physical memory page;

assign the additional allocation of persistent memory to the VM;

update the EPT to map at least one additional physical memory page maintained by the at least one of the memory devices to the second virtual logical blocks of the file based virtual memory; and provide the updated EPT to the VM for the VM to update the virtual disk abstraction for the file based virtual memory and for the VM to use the updated EPT to directly access the assigned additionally allocated persistent memory.

16. The at least one non-transitory machine readable medium of claim 15, the instructions to further cause the system to:

cause the VM to shut down;

generate a file from data stored to the assigned allocated persistent memory and the assigned additionally allocated persistent memory; and copy the file to a second host computing device arranged to support the VM.

17. The at least one non-transitory machine readable medium of claim 15, comprising the persistent memory allocated by a host operating system (OS) for the host computing device.

18. The at least one non-transitory machine readable medium of claim 17, comprising the VM to include a guest basic input/output system (BIOS) capable of enumerating the presence of the assigned allocated persistent memory based on the EPT provided to the VM.

19. The at least one non-transitory machine readable medium of claim 18, the one or more memory devices includes non-volatile memory maintained on at least one non-volatile dual in-line memory module (NVDIMM) coupled with the host computing device, wherein the VM is to enumerate the presence of the assigned allocated persistent memory based on information include in an NVDIMM firmware interface table (NFIT) arranged based on the ACPI specification, version 6.1.

20. The at least one non-transitory machine readable medium of claim 18, comprising the VM to include a guest OS kernel capable of creating the virtual disk abstraction for the file based virtual memory and using the EPT to directly access the assigned allocated persistent memory and the assigned additionally allocated persistent memory.

21. The at least one non-transitory machine readable medium of claim 16, the persistent memory maintain at the one or more memory devices comprises the persistent memory capable of storing data structures such that the data structures continue to be accessible after the data structures are created and following a power loss to the one or more memory devices.

22. The at least one non-transitory machine readable medium of claim 16, the one or more memory devices maintained on at least one dual in-line memory module (DIMM) coupled with the host computing device.

* * * * *